(12) United States Patent
Robinson

(10) Patent No.: US 8,572,846 B2
(45) Date of Patent: Nov. 5, 2013

(54) HOOP-STRESS CONTROLLED SHRINKING FOR EXHAUST COMPONENT

(75) Inventor: Mark Robinson, Columbus, IN (US)

(73) Assignee: Faurecia Emissions Control Technologies LLC, Columbus, IN (US)

( * ) Notice: Subject to any disclaimer, the term of this patent is extended or adjusted under 35 U.S.C. 154(b) by 1021 days.

(21) Appl. No.: 12/610,415

(22) Filed: Nov. 2, 2009

(65) Prior Publication Data

US 2010/0107413 A1 May 6, 2010

Related U.S. Application Data

(60) Provisional application No. 61/111,385, filed on Nov. 5, 2008.

(51) Int. Cl.
*B21D 51/16* (2006.01)

(52) U.S. Cl.
USPC .................................................. 29/890

(58) Field of Classification Search
USPC .................................................. 29/890
See application file for complete search history.

(56) References Cited

U.S. PATENT DOCUMENTS 6,954,988 B2 10/2005 Mayfield
6,983,632 B2 1/2006 Mayfield
7,111,392 B2 * 9/2006 Irie et al. ........................ 29/890

* cited by examiner

*Primary Examiner* — Richard Chang
(74) *Attorney, Agent, or Firm* — Carlson Gaskey & Olds

(57) ABSTRACT

A method for assembling an exhaust component includes providing a substrate assembly with a substrate body and a mat wrapped around the substrate body. A gauging system is used to determine a hoop stress for the substrate assembly and is used to predict a shrinking diameter for an outer shell that is to receive the substrate assembly based on the hoop stress.

16 Claims, 3 Drawing Sheets

HOOP-STRESS CONTROLLED SHRINKING FOR EXHAUST COMPONENT

RELATED APPLICATION

This application claims priority to U.S. Provisional Application No. 61/111,385, which was filed Nov. 5, 2008.

TECHNICAL FIELD

This invention generally relates to gauging of a mat and substrate combination of an exhaust component by using a hoop-stress based system.

BACKGROUND OF THE INVENTION

An exhaust system component, such as a catalytic converter for example, includes a substrate assembly having a catalytic substrate body and an associated insulating mat. A catalytic converter is typically assembled by stuffing the substrate assembly into a shell structure. The substrate assembly is formed by wrapping the insulating mat around the catalytic substrate body prior to insertion into the shell structure. The assembly is then stuffed into the shell structure such that the mat is compressed between the shell structure and the catalytic substrate body. A certain amount of pressure is required to retain the substrate assembly within the shell structure.

During assembly of the substrate assembly, the mat is compressed against the substrate, and then the substrate assembly is further compressed within the shell structure during a subsequent shrinking operation. During the assembly process, the pressure exerted against the substrate body must be high enough to achieve a desired retention pressure level between the substrate body and the mat, but cannot be too high such that the substrate body becomes cracked or otherwise damaged.

One known gauging method utilizes a pressure based system to achieve a desired pressure configuration. A peak breaking force is determined for the mat and substrate body, and a compression sequence for the assembly is then initiated at a force that is less than the peak breaking force. Such gauging systems have proven effective; however, more efficient and cost-effective systems are needed.

SUMMARY OF THE INVENTION

A method and apparatus is used to gauge a mat and substrate combination of an exhaust component by using a hoop-stress based system.

In one example, a method of assembling an exhaust component includes providing a substrate assembly with a substrate body and a mat wrapped around the substrate body. A gauging system is used to determine a hoop stress for the substrate assembly and to predict a shrinking diameter for an outer shell that is to receive the substrate assembly based on the hoop stress.

In one example, the gauging system measures strain on the substrate assembly and determines the hoop stress based on the measured strain.

In one example, the gauging system includes a pipe fixture defining an internal cavity that receives the substrate assembly prior to final assembly into the outer shell. A sensor assembly measures the strain exerted on the substrate assembly when inserted into the pipe. A controller receives strain measurements from the sensor assembly, determines a hoop stress of the substrate assembly based on the measurements, and predicts the shrinking diameter for the outer shell based on the hoop stress.

A predicted shrinking diameter is to provide a desired gap bulk density value. In one example, a gap bulk density check is performed subsequent to applying the shrinking diameter to the outer shell to ensure that the predicted shrinking diameter is actually providing the desired gap bulk density value.

These and other features of the present invention can be best understood from the following specification and drawings, the following of which is a brief description.

DETAILED DESCRIPTION OF THE PREFERRED EMBODIMENT

Figure 1:
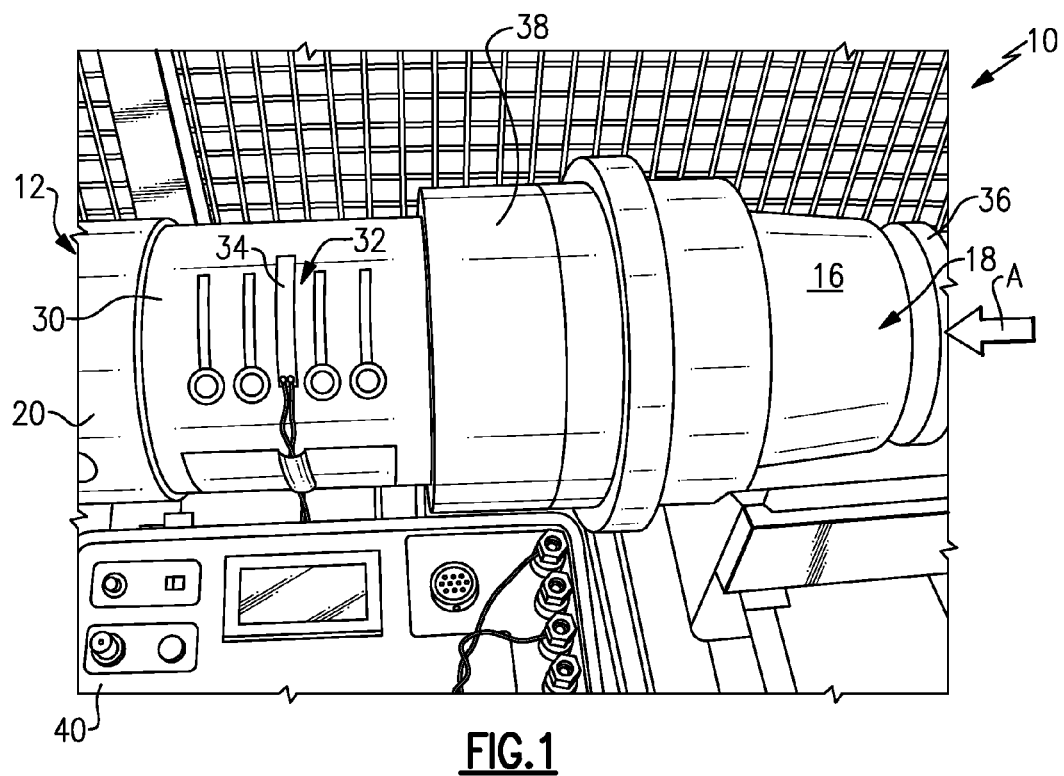
FIG. 1 is a schematic view of a static gauging system used for manufacturing an exhaust component.

FIG. 1 shows a static gauging system 10 and process for manufacturing an exhaust component 12 that uses hoop stress as a method of gauging tolerance stack up for the exhaust component 12. The gauging system 10 can be easily incorporated into a manufacturing line for producing final assembled exhaust components 12.

Figure 2:
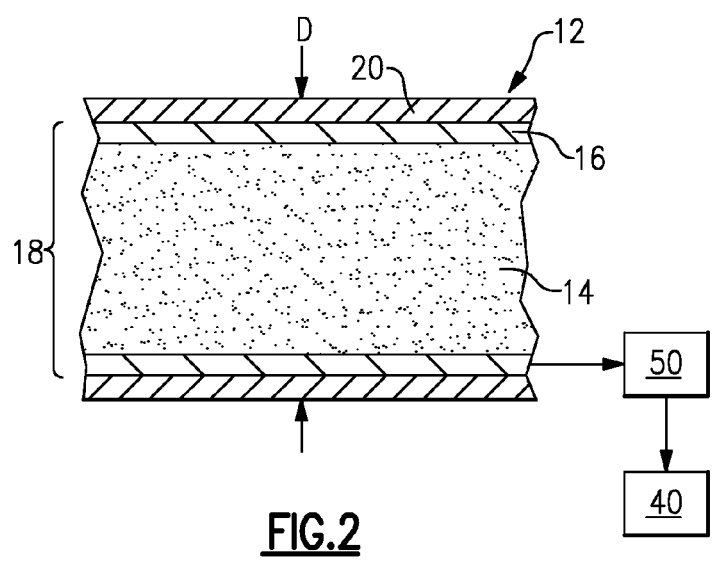
FIG. 2 is a schematic cross-sectional view of an exhaust component that is used with the static gauging system of FIG. 1.

One example of an exhaust component 12 is shown in FIG. 2. The exhaust component 12 includes a substrate body 14, a mat 16 wrapped around the substrate body 14 to form a substrate assembly 18, and an outer shell 20 to receive the substrate assembly 18. In one example, the exhaust component 12 comprises a catalytic converter that includes a catalytic substrate body. The operating characteristics of the catalytic converter are well known and will not be discussed in detail. Further, the structural components and materials that are used to form the catalytic converter are also well known and will not be discussed in detail. The subject invention is directed to an improved gauging method that predicts a shrinking diameter for the catalytic converter based on measured hoop stress.

As shown in FIG. 1, the system 10 includes a pipe fixture 30 that defines an internal cavity that receives the substrate assembly 18 prior to final assembly into the outer shell 20. A sensor assembly 32 is used to measure at least one substrate characteristic for the substrate assembly 18. In one example, the sensor assembly 32 includes at least one strain gauge 34 that is supported by the pipe fixture 30, and which measures strain on the substrate assembly 18 when the substrate assembly 18 is pushed into the pipe fixture 30. A pushing device 36 is used in combination with a stuffing funnel 38 to push or slightly stuff the substrate assembly 18 into the pipe fixture 30 as indicated by the arrow A shown in FIG. 1.

Once the strain gauge 34 measures the strain on the substrate assembly 18, the strain measurements are communicated to an electronic control unit or controller 40. The controller 40 determines a hoop stress of the substrate assembly 18 based on the strain measurements. As known, hoop stress for thin walled pressure vessels is determined based on the formula of $\sigma_h = Pr/t$ where P=Pressure; r=a radius of the vessel; and t=a thickness of the vessel.

Once the hoop stress is determined, the controller 40 predicts a shrinking diameter D (FIG. 2) for the outer shell 20 based on the hoop stress. Once the shrinking diameter D is predicted, the substrate assembly 18 is pushed through the pipe fixture 30 and into an un-shrunk outer shell 20, which is then subsequently subjected to a shrinking operation to form a final assembled exhaust component 12. The shrinking operation radially compresses the outer shell 20 against the substrate assembly 18 until the predicted shrinking diameter D is achieved.

The process is then performed with another substrate assembly 18. As such, each substrate assembly 18, prior to final assembly into an associated outer shell 20, is first pushed into the pipe fixture 30, strain is measured to determine hoop stress, shrinking diameter is predicted for that specific substrate assembly 18 based on the hoop stress, and then the substrate assembly 18 is removed from the pipe fixture 30 and subsequently pushed into the outer shell 20 where the shrinking operation is subsequently performed to produce the final exhaust component 12. These steps are repeated for each subsequent exhaust component 12.

Each combination of the mat 16 and substrate body 14 will have different tolerance stack-up values. As such, different levels of hoop stresses are induced due to the variances in tolerance stack-ups. The controller 40 records and correlates these different levels to predict the required shrinking diameter D. The controller 40 can include an internal recording unit, or a separate recording unit can be associated with the sensor assembly 32, with subsequent transmission of data to the controller 40.

The required shrinking diameter D should produce a desired gap bulk density (GBD) value for the final assembled exhaust component 12. GBD generally refers to an amount of compressed mounting mat material within a specified area. The predicted shrinking diameter D is to provide the desired GBD. After the shrinking operation is performed a GBD check can be performed via a system 50 (FIG. 2) to ensure that the predicted shrinking diameter is actually providing the desired GBD value. This GBD check can be performed for every exhaust component 12, or can be performed periodically. In one example, a desired target GBD is 0.4 g/cc at 1600 g/m2 of mat with a 4 mm finished gap; however, this could be varied as needed depending upon the application. Any type of system 50 can be used to determine the GBD value for a final assembled exhaust component, and the system 50 can include any of various sensors needed to perform the check. Once the actual GBD value is determined, the information can be communicated to the controller 40, which can record and store the information to assist in future predictions of shrinking diameters.

Figure 3:
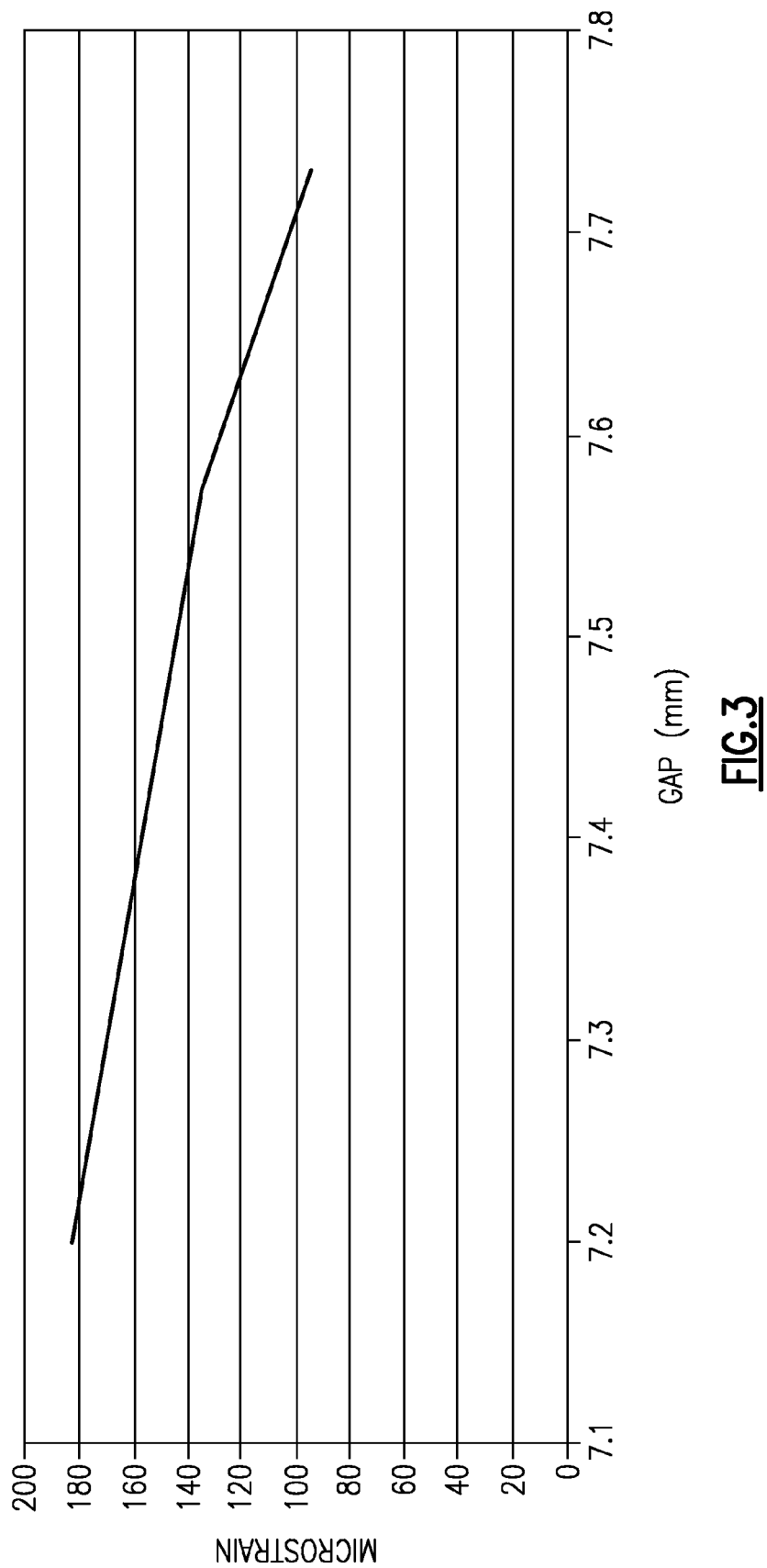
FIG. 3 is a gap vs. strain plot.
Figure 4:
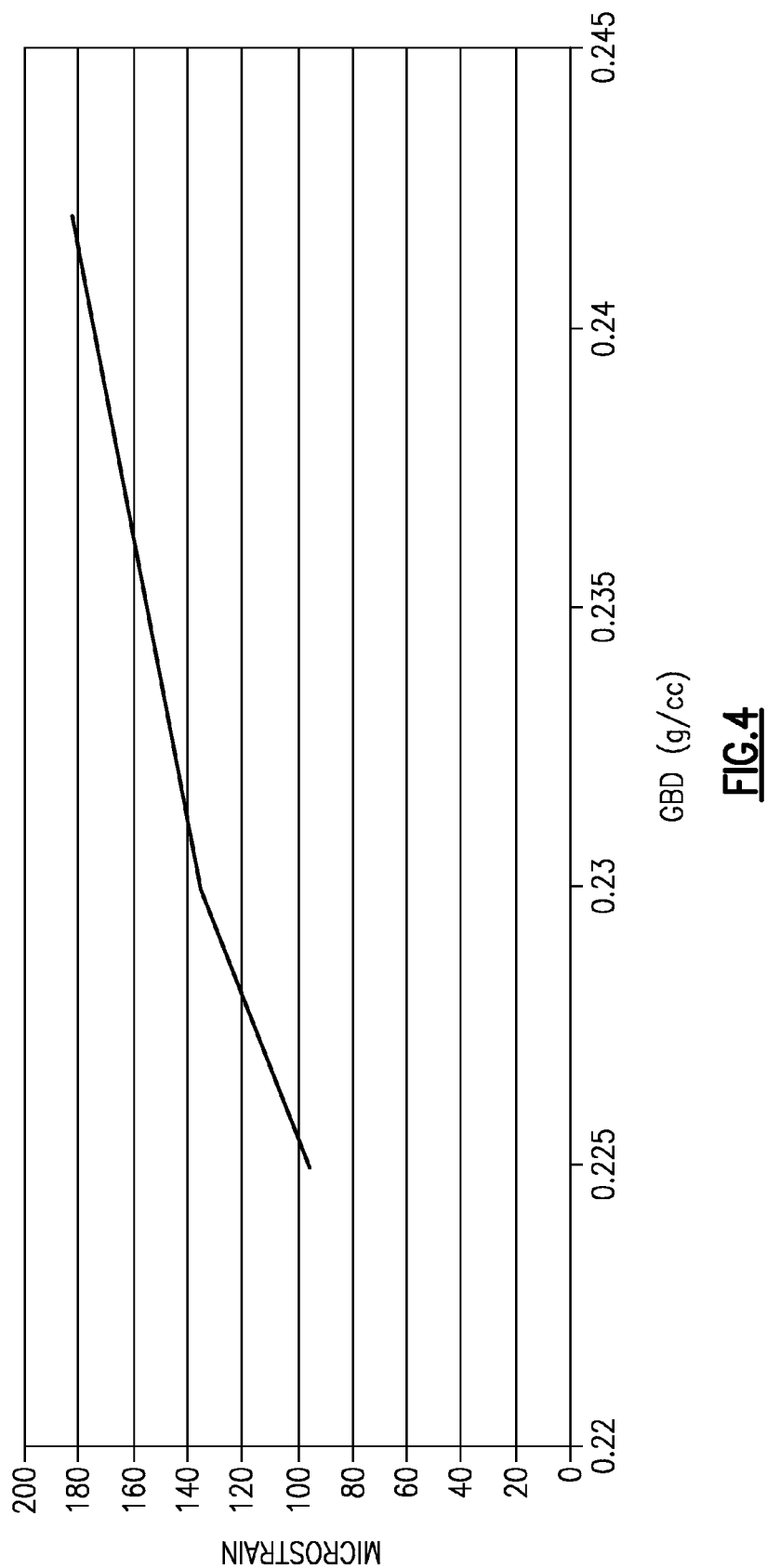
FIG. 4 is a gap bulk density vs. strain plot.

One example of a Gap v. Strain plot is shown in FIG. 3 and one example of a GBD v. Strain plot is shown in FIG. 4. As shown in FIG. 3, strain values decrease as the gap increases. Further, as shown in FIG. 4, strain values increase as GBD increases. As discussed above, the strain is measured for each substrate assembly 18 to determine the hoop stress and this, in combination with the desired GBD value, is used to predict the shrinking diameter.

Each substrate body 14 is wrapped with a pre-weighed mat 16 prior into insertion in the pipe fixture 30. The recording unit for the strain gauge 34 is zeroed prior to insertion of the assembly 18 into the pipe fixture 30. The substrate assembly 18 is then pushed into the pipe fixture 30 and stain is measured. The recording unit is then re-zeroed after the initial measurement such that negative strain can be measured during push out.

The subject gauging system predicts shrinking diameter based on hoop stress that is calculated based on these measured strain levels. This system provides significantly reduced costs when compared to prior pressure based gauging systems. Further, the subject system provides for quick changeover operations and reduced cycle times.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of assembling an exhaust component comprising:
   (a) providing a substrate assembly including a substrate body and a mat wrapped around the substrate body;
   (b) determining a hoop stress for the substrate assembly; and
   (c) predicting a shrinking diameter for an outer shell that is to receive the substrate assembly based on the hoop stress determined in step (b).

2. The method according to claim 1 wherein step (b) further includes inserting the substrate assembly into an instrumented pipe structure and determining the hoop stress for that substrate assembly.

3. The method according to claim 2 wherein the substrate assembly comprises a first substrate assembly and including the steps of removing the first substrate assembly from the instrumented pipe, inserting a second substrate assembly into the instrumented pipe, determining a second hoop stress for the second substrate assembly, and predicting a second shrinking diameter for a second outer shell based on the second hoop stress.

4. The method according to claim 2 wherein step (b) includes measuring strain on the substrate assembly while in the instrumented pipe, and subsequently determining the hoop stress based on the measured strain.

5. The method according to claim 2 including recording hoop stresses determined in step (b).

6. The method according to claim 2 including weighing the mat before wrapping the mat around the substrate body.

7. The method according to claim 2 including
   (d) removing the substrate assembly from the instrumented pipe structure and inserting the substrate assembly into an un-shrunk outer shell; and
   (e) shrinking the outer shell to the shrinking diameter predicted during step (c).

8. The method according to claim 1 including inserting the substrate assembly within the outer shell subsequent to step (c) and applying the shrinking diameter predicted in step (c) to the outer shell to form a final exhaust component.

9. The method according to claim 8 wherein the final exhaust component comprises a catalytic converter.

10. The method according to claim 8 wherein a predicted shrinking diameter is to provide a desired gap bulk density value, and including the steps of performing a gap bulk density check subsequent to applying the shrinking diameter to ensure that the predicted shrinking diameter is actually providing the desired gap bulk density value.

11. The method according to claim 1 including
   (d) shrinking the outer shell to the shrinking diameter predicted during step (c) in a single shrinking step to form a finished exhaust component.

12. The method according to claim 1 wherein step (b) includes measuring strain to determine hoop stress.

13. The method according to claim 1 including using predicted shrinking diameter from step (c) to provide a desired gap bulk density.

14. The method according to claim 13 including
(d) shrinking the outer shell to the shrinking diameter predicted during step (c), and
(e) performing a gap bulk density check can be performed subsequent to step (d) to ensure that the predicted shrinking diameter is actually provides the desired gap bulk density.

15. The method according to claim 1 including
(d) performing steps (b) and (c) prior to inserting the substrate assembly into an outer shell.

16. The method according to claim 15 including
(e) inserting the substrate assembly into the outer shell subsequent to predicting the predicted shrinking diameter, and
(f) shrinking the outer shell to the predicted shrinking diameter.

\* \* \* \* \*